United States Patent [19]

Flanagan

[11] 4,274,149
[45] Jun. 16, 1981

[54] BINOCULAR DEVICE FOR DISPLAYING ELAPSED TIME IN THE FIELD OF VIEW

[76] Inventor: Charles E. Flanagan, 2208 Shadydale, Arlington, Tex. 76012

[21] Appl. No.: 117,647

[22] Filed: Feb. 19, 1980

[51] Int. Cl.³ .................... G04B 47/00; G02B 27/14
[52] U.S. Cl. ...................................... 368/10; 350/174
[58] Field of Search .................. 368/10, 89, 107, 113, 368/278, 316, 317; 206/315 R; 350/36, 174

[56] References Cited

U.S. PATENT DOCUMENTS

| | | | |
|---|---|---|---|
| 2,428,662 | 10/1947 | Flint | 368/10 |
| 3,962,861 | 6/1976 | Protta et al. | 368/188 |
| 4,012,123 | 3/1977 | Fuller | 350/174 |

*Primary Examiner*—Vit W. Miska

[57] ABSTRACT

An apparatus for providing superimposed readout of digital information onto the field of view in binoculars, with said digital information typically being related to elapsed time. A chronometer device of the type commonly employed in electronic watches having an LED display is mounted internally of a conventional housing for binoculars (or a similar optical instrument). The chronometer device measures elapsed time in a conventional manner; and, the switches for controlling the chronometer device are preferably mounted on the right barrel of the binoculars, where they may be activated by either the thumb or index finger of a person's right hand. An LED digital display is mounted internally of one of the barrels, preferably the right barrel, where the display may be seen when a viewer looks through the binoculars. The digital display is biased so as to always remain immediately next to the eyepiece of one barrel, in order that it will remain in focus when any focusing adjustment is made by the viewer. When the viewer is watching an event such as a horse race and he has activated the chronometer device, he will see the display of elapsed time superimposed onto the horses being observed, etc.

28 Claims, 6 Drawing Figures

BINOCULAR DEVICE FOR DISPLAYING ELAPSED TIME IN THE FIELD OF VIEW

This invention relates generally to optical viewing instruments commonly known as binoculars, and it also relates to timing devices having characteristics of electronic stop watches or chronometers. More particularly, it relates to a combination optical/timing apparatus in which a viewer can observe things within the field of view of binoculars and also observe elapsed time (or the like) without removing the binoculars from their normal viewing position.

There are many occasions when elapsed time is of interest to a person when he is watching some activity with his binoculars. Examples of such activities include horse racing, track events involving races, swimming meets, car races, boat races, etc. In times past, it has been necessary that a person observing such a time-dependent activity from a distance had to possess two instruments: binoculars or some other optical instrument, and a time-keeping device such as a stop watch. The advent of electronic stop watches has added a significant capability to the timing of certain sporting events, in that lap speeds can be monitored at the same time that total elapsed time is being recorded—with the same instrument. Thus, it has been possible in recent years to have binoculars of excellent quality and to also have timing devices with great accuracy as well as versatility. Unfortunately, the use of these two diverse instruments has required that a person change the direction of his attention and refocus his eyes at a different spot as he switched from using the binoculars to monitoring the stop watch and then returning to the binoculars, etc. Accordingly, there has existed a need for a device in which the information typically provided by a modern stop watch or chronometer could be superimposed on the field of view of the binoculars, so that a person might simultaneously watch some event with his binoculars and also observe the display of passing time.

The desire to superimpose numerical information on the field of view of the binoculars has not been restricted to time-based events, and two examples of combinations of binoculars with other devices can be found in U.S. patents. U.S. Pat. No. 2,022,516 to Owen entitled "Optical Viewing Instrument" discloses the combination of binoculars with a compass so that a person looking in a particular direction could simultaneously see something within his field of view and also see the image of a mechanical scale which provides information about the direction (with respect to the observer) that he is looking in order to see some object. Such a device has utility, for example, for a person in a lighthouse who is observing a ship on the horizon and wishes to know the azimuth of that ship at any given time. As contrasted with the invention to be disclosed herein, the Owen construction has at least three significant differences. First, an external source of light is required in order to illuminate the device which is to provide what may be called "secondary," or non-optical, information. That is, there must be sunlight or a source of artificial illumination to illuminate the compass-type device in order that reflected light may somehow be transferred to an interior portion of the binoculars (so that the secondary device is visible to the viewer). A second distinguishing feature is that the device which provides the secondary information is completely external to the housing of what would otherwise be conventional binoculars. And, thirdly, to modify conventional binoculars in such a way that they could receive and display information from the secondary device would require extensive structural changes and alterations to the housing of a conventional pair of binoculars. In other words, it would be essentially impractical to take a housing for conventional binoculars and easily convert that housing into an apparatus as taught by Owen. Accordingly, it is believed that an apparatus in accordance with the teachings of Owen could only be manufactured as a custom-made device which would require special tooling and unique structural supports and fittings, etc.

Another interesting apparatus is shown in U.S. Pat. No. 4,012,123 to Fuller entitled "Binocular Device for Displaying Numerical Information in the Field of View". This construction is reported to have application in the flying of radio-controlled model airplanes, where sensed information about a flying airplane (such as airspeed and angle of attack) is transmitted to earth with telemetering equipment and changed into numerical form for subsequent display in the field of view of the binoculars. As with the previously described Owen instrument, there are at least two significant characteristics of the Fuller device which are appreciably different from the invention to be disclosed herein. First, the Fuller device requires a very large appendage to what would otherwise be a conventional binocular housing. Thus, there is no way that binocular housings fabricated on a conventional assembly line with standard tooling could be made to accomodate the auxiliary optical system disclosed by Fuller. As with Owen, then, a specialized housing would be required in order to manufacture a Fuller device. Secondly, the Fuller auxiliary mirror which reflects numerical information into the user's eyes will inevitably cut off a significant portion of the light passing through the supporting barrel, thereby introducing an adverse effect into the optical system. That is, it is believed to be impossible with the current state of the art to insert a beam splitter into a light path without blocking off at least some light.

Accordingly, there has remained a substantial need for a truly operative binocular device which is capable of being combined with an auxiliary apparatus in which a numerical display of time (or other information such as day, date, etc.) may be superimposed onto the field of view. It is an object of this invention, therefore, to provide such a construction.

It is another object to provide a time-keeping device which is configured so as to be installed within commercially available binocular housings without requiring any enlargement of the housing or alteration of the optical system.

It is another object of this invention to provide a chronometer device which is combined with a conventional binocular housing and in which the switches (or "buttons") for controlling the chronometer device are mounted in a convenient location so that they may be readily activated without requiring any significant visual searching or identification. (One result of this is to permit the viewer to concentrate on the event being observed—without requiring him to change his attention from the event to the switches in order to activate the "right" switch.)

Still another object is to provide a combination optical device and time-keeping apparatus which is capable of being easily incorporated into new instruments and also adaptable for modification of existing binoculars, such that a person who already owns an excellent pair of binoculars can realize the benefits of this new construction without having to purchase an entirely new combination.

These and other objects will be apparent from a reading of the specification and the claims appended thereto, as well as reference to the attached drawings in which:

Figure 5:
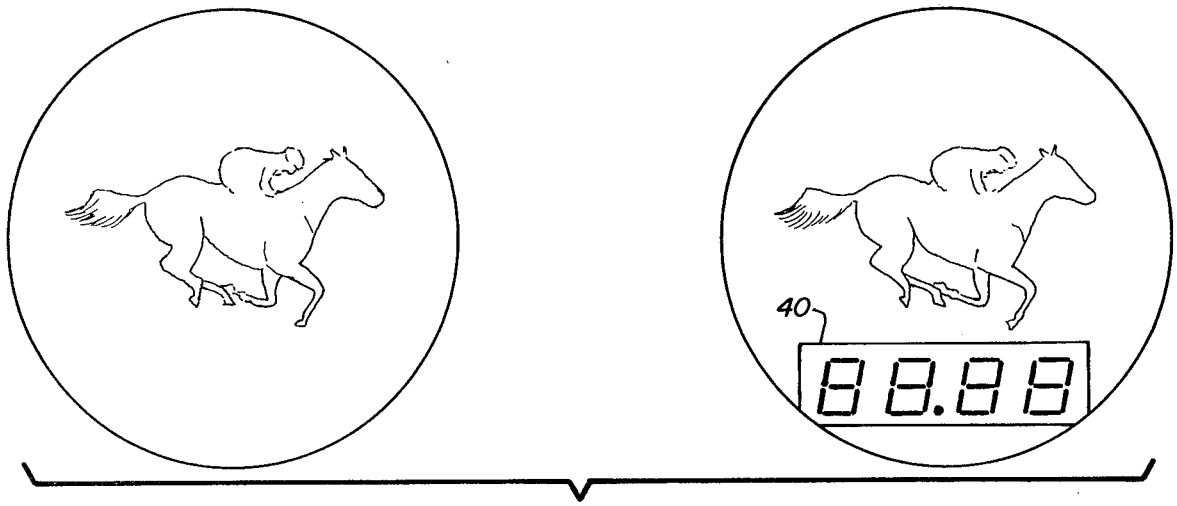
Figure 6:
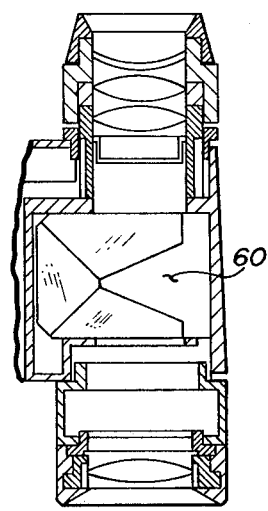

FIG. 5 is an illustration of the respective views which a viewer sees in the two barrels of binoculars, with the LED display shown in a preferred position in the right barrel and near the bottom of the image area, and the display having a preferred size so as to be relatively unobtrusive (as far as blocking off much of the field of view); and FIG. 6 is a longitudinal cross-sectional view of a portion of roof prism binoculars—and particularly showing the "dead space" which is available for installing a chronometer device within the binocular housing.

In brief, the invention includes a pair of telescopes mounted side-by-side, as in conventional binoculars. In order to foster economy of manufacture, it is preferred that conventional prism binoculars of the Porro type be utilized as the "optical" portion of the combination. Mounted within the housing for said binoculars is a chronometer device for measuring elapsed time; said device may be substantially the same as that used in electronic watches having an L.E.D. display. The chronometer device is expected to be battery operated, and an access door is preferably provided in one wall of the binocular housing in order that weak batteries may be replaced by the user of the instrument. A digital display is mounted within one of the binocular barrels, and preferably the right barrel, in which case all of the time-keeping and display elements can be provided within the same barrel. The digital display is mounted immediately next to the lens system of an eyepiece, so as to always remain in focus. If the eyepiece adjacent the digital display is moveable (for focusing purposes), the digital display is biased by a spring or the like in order to always "track" movement of said eyepiece. The digital display preferably consists of four 7-segment L.E.D. digits that are about 2 mm high, such that the four digits occupy slightly less than 9 square mm. By limiting the opaque display backing to less than 40 square mm, there should be much less than 25% of the normal field of view in one barrel which is "blocked" by the digital display. Of course, the field of view through the second barrel of the binoculars is in no way affected, so that the combined image seen by the viewer is simply that of numerals superimposed onto the field of view. The combination probably has its greatest utility in observing events which are recognized as being significantly time-dependent, such as horse races and athletic events in which lap time or total elapsed time is important. Except for the presence of certain external switches for controlling the chronometer device, the binocular housing of this invention need not be distinguishable from conventional binoculars. That is, there is no need for any bulky appendage to a housing for conventional binoculars in order to accomodate the chronometer device of this invention; the wires, switches, batteries, etc., can all be installed without interfering with the sensitive orientation of the optics system of the binoculars.

Figure 1:
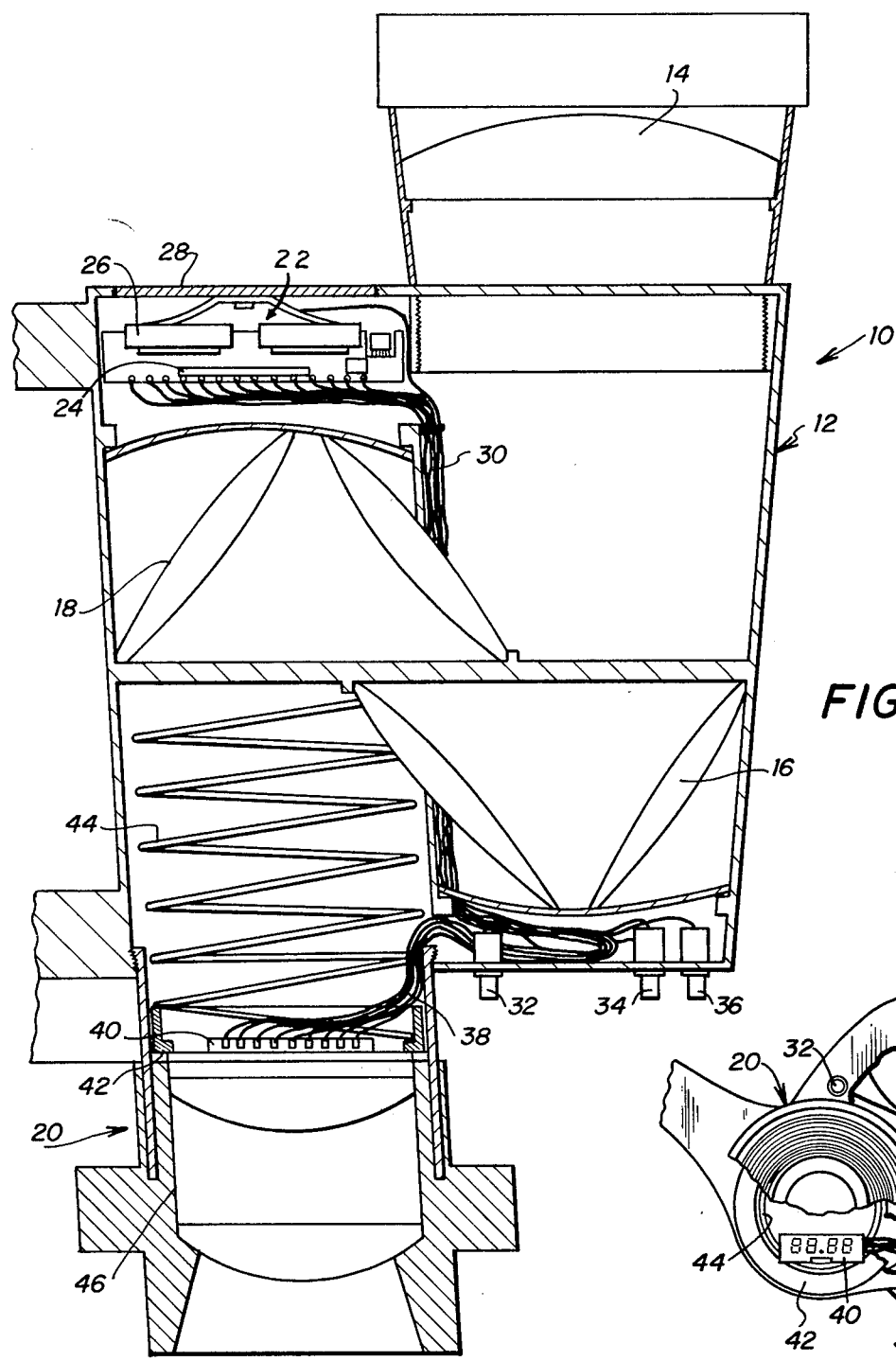
FIG. 1 is a longitudinal cross-sectional view of the right half of a conventional binocular housing or barrel, with the cutting plane being in the plane defined by the longitudinal axes of the two barrels.

Referring initially to FIG. 1, which is a cross-sectional view of the right half of a conventional binocular housing or "barrel" 12, there are provided conventional prisms which are arranged so as to permit a viewer to see distant objects in three-dimensional space. And, as is well known, each eye receives an image that originates from a viewpoint which is laterally displaced from that seen by the other eye. As far as the optics of this right barrel 12 are concerned, nothing has been altered or changed in the housing. Light entering the objective lens 14 passes to the first of two Porro prisms 16, is subsequently reflected by the second prism 18, and then passes through the right eyepiece 20. This is important because those skilled in the art will appreciate how important it is in such telescopes that the light path from the objective to the eyepiece be carefully maintained in accordance with very exacting standards. In fact, it is well recognized that the optical axes of the two binocular barrels should be aligned so as to be parallel to each other within a few minutes of arc. The accuracy to which binocular parts must be made and the requirement for absolute stability of those parts after they are assembled (in order to provide and maintain parrallelism) largely accounts for the high cost of quality binoculars. It would be counterproductive, therefore, to start with binoculars having an excellent optical system and then negate its advantages by moving lenses or otherwise altering the system to accomodate a time-keeping device within the housing.

Referring still to FIG. 1, there is provided within the housing 10, in what would otherwise be "dead" or wasted space, a chronometer device 22 for measuring elapsed time. The chronometer device 22 includes a time-keeping device 24 which preferably is of the type which is routinely employed to measure elapsed time in an electronic stopwatch. Functionally, the chronometer 22 may be a simple 4-function stopwatch having the features offered by an INTERSIL IC 7215 chip, or it may be more sophisticated—including an alarm (which would provide an aural indication when a record speed is being established, etc.). Suitable batteries 26 are also mounted within the housing 10; and an access door 28 is preferably provided so that the owner of the binoculars could easily replace a weakened battery—thereby avoiding any inconvenience of using the services of a repairman who is skilled in working on binoculars. Alternatively, rechargeable nickel-cadmium batteries may be permanently mounted within the housing, and a jack would be provided to recharge the batteries from time to time, much like miniature calculators and dictating machines are presently recharged.

Figure 2:
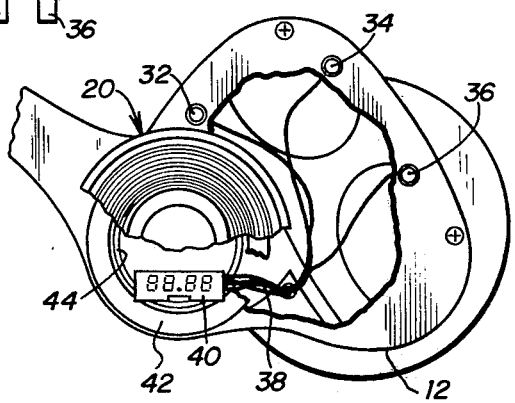
FIG. 2 is an end view of the apparatus as shown in FIG. 1, partially broken away to reveal a display which is mounted near the eyepiece end of one barrel of the binoculars.

Connected to the time-keeping portion of the chronometer device through a bundle of wires 30 are appropriate switches 32, 34, 36 and, through other wires 38, a digital display 40. The digital display is positioned within the binocular housing 10 so as to be visible and in focus when a user places the housing adjacent his eyes for the purpose of viewing something within his field of view. Referring additionally to FIG. 2, a digital display 40 is shown in the lower portion of the sight area in the right eyepiece. Unlike the conventional display of an LED electronic watch, the digital display 40 of this invention includes numerals that are physically closer together and which are substantially lower in brightness than conventional watches. The reason for having a lower brightness in the display 40 is that a standard LED watch display actually produces so much light that it would appear much like a spotlight in the viewer's right eye, thereby making it awkward to concentrate on a distant object in the field of view. That is, the amount of light which enters conventional binoculars through the objective lens is so limited that it would be overwhelmed by the light emanating from a standard watch-type LED display. In order to utilize commerically available watch-type displays in a construction shown in FIGS. 1 and 2, there must be provided a set of carefully matched resistors which are provided in series with the various elements of the LED display. Resistors having a value of 590 ($\pm$0.1%) ohms, in combination with the relatively fine wires 30, 38 (which are preferably made with No. 41 gauge stranded wire), provide sufficient resistance to the flow of current that the display 40 is only about half as bright as conventional LED watch displays.

A further distinguishing feature about the numerals in the display 40 and conventional watch displays is the size of the four digits which make up the display. A typical LED watch display is about 19 mm long, while the four numerals in display 40 should not be any larger than 17 mm long in order to have four complete numerals easily visible within the field of view. The emphasis on the word "complete" numerals is appropriate here because a standard watch display includes only a partial numeral on the far left of a four-digit display. This is because conventional watches never have any occasion to display hours above 12; and, only the two right-hand segments of a conventional seven-segment display are necessary in order to provide the "one" for 10, 11, and 12 o'clock. Designers of watch displays have therefore sized their watch housings in such a way as to cover or ignore the space normally occupied by the other five segments of a seven-segment numeral. Because this invention is concerned with recording as much as 59.99 seconds or 59.99 minutes, it is necessary that four complete digits be fully visible in the display 40.

The height of visible numerals in a typical LED watch display is usually more than 3 mm, which is quite satisfactory for most people to see at arm's length. However, under the 7$\times$ power magnification of conventional binoculars, such numerals would appear to be grotesquely large and, probably, undiscernable. The numerals in a display 40 are preferably slightly less than 2 mm and may be categorized as being only about one-half as large as the digits in a typical watch.

As with all LED displays, the digital display 40 has an opaque backing, and this effectively blocks off a small portion of the field of view of its associated telescope. But the opaque backing typically has a size of no more than about 40 square millimeters; so, relatively little of the right field of view has been blocked off—and none of the left field of view has been lost. Thus, the two images received by the viewer's two eyes are mentally fused into a single three-dimensional image with essentially no loss in perception. The effect on the viewer is to superimpose a readout of digital information onto the field of view.

Referring still to FIG. 1, it is preferable that the digital display 40 be associated with the right barrel of the binoculars, in order to minimize the length of connecting wires 38 and avoid the physical difficulties that would be present if the digital display was in one of the barrels and the time-keeping device 24 was in the other barrel. And, because most people are right-handed, it is preferred that at least the most commonly used of the switches 32, 34, 36 be associated with the right barrel 12. This desire to consolidate all of the operational elements of the invention within one barrel essentially dictates that they be in the right barrel; but, if a person is willing to face the structural difficulties of having various portions of the apparatus divided into two barrels, there is no reason why this would not be technically feasible. By electing to place all of the operational elements in the right barrel, it is true that a small problem is introduced—namely, how to keep the digital display 40 horizontal and in focus if the eyepiece on the right barrel 12 is rotatable about a longitudinal axis (in order to accommodate such differences as may exit between a person's two eyes). If the digital display 40 was mechanically fixed to the right eyepiece such that the display rotated with the eyepiece as the eyepiece was manually rotated to optimize focusing of the binoculars, it is conceivable that one person might see the display 40 essentially horizontal and another might see it tilted to either the right or the left. This difficulty has been avoided by mounting the digital display 40 on a ring or collar 42, which is suspended within the right barrel 12 by a resilient element such as coil spring 44. The spring 44 is always maintained in compression and the ring 42 is always forced toward the eyepiece, regardless of the relative position of the eyepiece with respect to the barrel 12. That is, as the eyepiece is manually rotated and the longitudinal distance between focusing lens system 46 and prism 18 changes, the collar 42 maintains the same orientation even though it may be changing distance with respect to prism 18. The effect is to maintain the digital display 40 both in focus and horizontal when the binocular focusing device is manually adjusted. Because the diameter of the coil spring 44 is relatively large, a person looks axially through the coil spring when observing an object, and any very slight movement of the coil spring is never seen by the viewer.

Referring specifically to FIG. 2, the control switches 32, 34, 36 will now be described in greater detail. Switches or buttons 34, 35 are equivalent to those commonly used in a typical stopwatch, with switch 34 preferably controlling the start/stop function and switch 36 controlling the reset function. Switch 34 is perhaps the easiest switch to find without using a person's eyes, because it is the highest of the three switches. And, by physically separating the three external buttons by a minimum of one centimeter, a person may concentrate his attention on handling the binoculars, keeping his eyes focused on some activity, and relying on tactile feel to identify the various switches which he wants to activate. Accordingly, the highest button is preferably utilized as the major control button for the stopwatch function of a CMOS timer. A user would typically push button 34 once in order to show the time of day—which is illuminated temporarily and then preferably goes off (in order to conserve battery power). Pressing button 34 a second time starts the clock; the display 40 will also be activated and will reveal the counting of a few seconds. To conserve battery power, the display again goes blank, but the clock continues to count. At any given time, the user can call-up for display the time which is being counted—by pressing button 36. The display 40 will continuously change with the passage of time, going to 59.99 seconds and then starting again with 00.00. The accumulated minutes overflow to a memory and are called-up by pressing button 36 after the clock has stopped (by pressing start/stop button 34). Pressing button 36 one more time will erase the display 40 and reset the watch for another sequence. Of course, those skilled in the art will recognize that there are many clock IC's available which may operate in slightly different modes of display and counting. For example, the ICM 7045 circuit offered by Intersil, Inc. of Cupertino, Calif. is a digital timer/stopwatch/24-hour clock that uses slightly different switch operations but which achieves basically the same result as that described above. And, no doubt other variations may be incorporated into new circuits as the public becomes acquainted with the concept disclosed herein and more functions are proposed.

Figure 3:
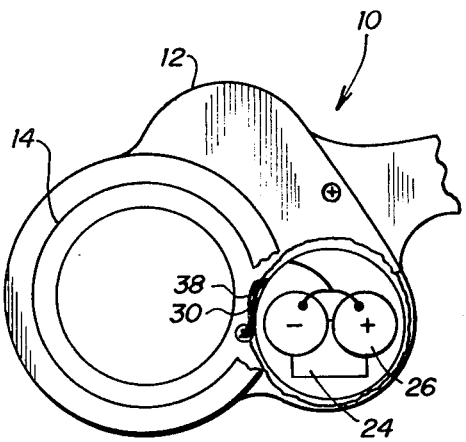
FIG. 3 is an end view of the structure shown in FIG. 1, taken from the opposite direction as the view shown in FIG. 2, with a portion of the housing being broken away to reveal a convenient location for mounting a battery pack, etc.

Referring next to FIG. 3, the objective lens end of one of the two telescopes is shown, with the binocular housing being partially broken away to reveal a preferred location for the battery pack and the timing device. The removable cover plate which sealingly encloses the batteries 26 and timing device 24 may be designed so as to be flush with a vertical end wall of the housing 10; if desired, then, only the presence of the manually operable switches 32, 34, 36 (FIG. 1) would render the apparatus externally distinguishable from conventional prism binoculars. Of course, if it should be desirable for some reason, it would be possible to place the batteries and timing device in an appendage that is affixed to the exterior of a binocular housing.

Figure 4:
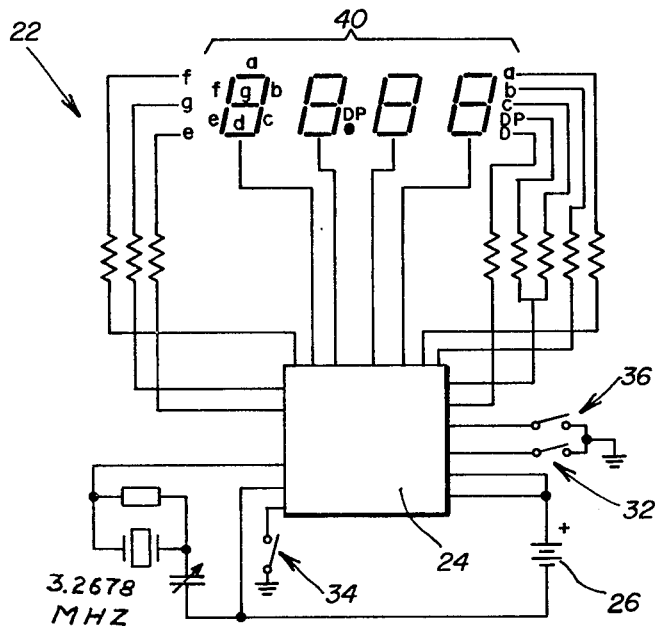
FIG. 4 is a schematic diagram of an illustrative chronometer device, including four 7-segment numerical displays and a decimal point, as well as the eight matched resistors which are employed in order to provide an appropriate intensity for the numerical displays.

FIGS. 4 and 5 show a preferred display 40 for presenting elapsed time to a viewer so that he might observe the passage of time at the same time that he watches a horse race or the like. The four 7-segment LED displays are self-illuminating, of course, so no external lighting is required. An LCD display could be used in accordance with the teachings disclosed herein, but auxiliary lighting would likely be desirable in order to render all of a set of alphanumeric characters easily discernable. Furthermore, the relative intensity of an LCD display and the image which is presented at the ocular lens system could be somewhat difficult to balance. Accordingly, an LED display is definitely preferred.

The chronometer device disclosed herein is believed to be compatible with essentially all high-quality binoculars which are commercially available, including prismatic binoculars offered by Bausch and Lomb, Zeiss, Tasco, Asahi Pentax, etc. And, even the new roof prism binoculars have been found to have sufficient "dead space" as to make possible the internal mounting of a chronometer device as disclosed herein. FIG. 6 illustrates a space 60 which could readily accomodate the devices described herein, including switches, etc. However, the switches for a roof prism binocular would not likely be on a vertical end plate—as shown in FIG. 1; rather, the switches would be mounted at the side of the binocular housing. Depending on whether the viewer is right-handed or left-handed, the switches (and the remainder of the chronometer device) would logically be mounted on that barrel which would promote easier activation by the viewer.

While only the preferred embodiment of the invention and a few alternative embodiments have been disclosed in great detail herein, it should be apparent to those skilled in the art that variations of the structure disclosed herein would naturally fall within the scope of the appended claims. For example, it is preferred that Teflon-coated stranded wire be used to connect the respective electronic components, but other wiring choices may be preferred for some applications. And, it is advantageous to have the chronometer device cause an "8" in the far left digit when the batteries become so weak as to be marginally useful; but this optional feature is not critical to normal operation of the invention. It is also preferred to have all of the time-keeping apparatus and switches in the right barrel of binoculars, because most people are right-handed; but, mounting all of the chronometer elements in the left barrel is certainly a practical option for the manufacturer. The display of elapsed time (in minutes, seconds, or fractions thereof), time of day, day of week, month, year, etc., is optionally available to the designer, and whatever seems to be most appropriate for the user will naturally be selected by a person skilled in the art. These and other variations should be understood to be encompassed by the attached claims.

What is claimed is:

1. Apparatus for providing a superimposed readout of digital information onto the field of view in binoculars, comprising:

(a) binoculars, including a housing having two generally co-extensive barrels;

(b) a chronometer device for measuring elapsed time, with said device being mounted in the binocular housing and including a digital display for displaying the information generated by a time-keeping portion of said chronometer device, and said digital display being positioned within the binocular housing so as to be visible and in focus when a user places the binocular housing adjacent his eyes for viewing something within his field of view; and (c) switch means mounted on said binocular housing for controlling operation of said chronometer device.

2. The apparatus as claimed in claim 1 wherein the switch means includes a stop/start switch function and a reset-to-zero switch function.

3. The apparatus as claimed in claim 1 wherein said binocular has a manually adjustable focusing device, and said digital display is mounted on a non-rotatable structural element so that it remains in focus and also remains horizontal when the binocular focus device is manually adjusted.

4. The apparatus as claimed in claim 1 wherein digital display includes a plurality of multisegment light emitting diodes and a battery.

5. The apparatus as claimed in claim 4 wherein the light emitting diodes are located near the eyepiece end of one of the binocular barrels, and the battery is located near the opposite end of the same barrel.

6. The apparatus as claimed in claim 4 wherein the two coextensive barrels constitute right and left barrels, and wherein both the light emitting diodes and the battery are mounted on the right barrel.

7. The apparatus as claimed in claim 1 wherein the switch means includes at least one switch on the right side of the binocular housing where it may be easily actuated by one digit of a person's hand when the hand is being held in a typical binocular-supporting position.

8. The apparatus as claimed in claim 1 wherein the entire chronometer device is mounted within a prism-type binocular housing, and wherein the chronometer device and switch means are located externally of the optical path through the prism system such that there is no alteration or interference with the optical system of said binoculars.

9. The apparatus as claimed in claim 1 wherein the switch means includes at least three distinct switches that are physically separated by a minimum of one centimeter.

10. The apparatus as claimed in claim 1 and further including an aural alarm which is actuated at a selected time by the chronometer device.

11. Apparatus for providing a readout of time-based information within the field of view of an optical instrument, comprising:
(a) an optical instrument adapted to give enhanced view of a distant object through two similar telescopes, with the telescopes having housings which are connected and positioned side-by-side so as to permit simultaneous viewing by each of a person's eyes, and each of the telescopes including an objective lens and an eyepiece located respectively at opposite ends of the telescope;
(b) a battery-powered time-keeping device mounted on the housing of one of the telescopes, and a battery for powering said device being carried internally of one of the telescopes;
(c) a digital display operatively connected to said time-keeping device so as to display information generated by said time-keeping device, and said digital display being self-illuminating and being mounted within one of the telescopes so as to be visible when a person places the telescopes in front of his eyes for viewing a distant object; and
(d) manually operable switch means carried by one of the telescope housings for controlling operation of said time-keeping device, whereby the display of time-dependent information may be controlled by the user of said optical instrument without removing his eyes from a viewing position.

12. The apparatus as claimed in claim 11 wherein the time-keeping device constitutes a stopwatch, and the switch means includes means for initiating the measurement of elapsed time from a start signal, and further including means for generating said start signal, and means for selectively resetting the time-keeping device to zero.

13. The apparatus as claimed in claim 11 wherein the time-keeping device is mounted internally of the housing of one of the telescopes near the objective lens of said telescope, and the digital display is positioned adjacent the eyepiece of the same telescope.

14. The apparatus as claimed in claim 11 wherein the distance between the eyepiece and the objective lens of one of the telescopes is selectively adjustable so as to foster optimum viewing for a person looking simultaneously through the two telescopes, and wherein the digital display is biased so as to move with a movable eyepiece whenever the distance between said movable eyepiece and its associated objective lens is changed.

15. The apparatus as claimed in claim 14 wherein the digital display is biased toward a movable eyepiece through a coil spring whose diameter is sufficiently large so that a person looks axially through said coil spring when observing an object through the associated telescope.

16. The apparatus as claimed in claim 11 wherein said switch means includes at least three separate switches for controlling three distinct functions of said time-keeping device.

17. The apparatus as claimed in claim 11 wherein the time-keeping device and the digital display and the switch means are electrically connected by wires which are mounted internally of one of said telescope housings.

18. The apparatus as claimed in claim 11 wherein the time-keeping device includes an integrated circuit and the digital display includes at least three light-emitting diodes.

19. The apparatus as claimed in claim 11 wherein the time-keeping device and the digital display are mounted internally of the same telescope housing, and the switch means includes manually activated switches which are externally positioned on the same telescope housing, and said telescope housing is sealed against the entry of dust and other contaminants.

20. The apparatus as claimed in claim 11 wherein the optical instrument constitutes prism binoculars, and the time-keeping device and the digital display are mounted internally of a binocular housing in such a way that only the presence of the manually operable switch means renders the apparatus externally distinguishable from prism binoculars which have not been altered by inclusion of the time-keeping device.

21. The apparatus as claimed in claim 11 wherein the housing on which the time-keeping device is mounted has a removable plate for providing access to a battery receptacle, and said receptacle is positioned in a location where the battery can be replaced without contacting any of the structural elements which mount a lens within a telescope.

22. The apparatus as claimed in claim 11 wherein the digital display includes four 7-segment light emitting diode numerical displays, and said four displays being arranged as two pairs which are identifiable as right and left pairs of displays, and further including a decimal point between the right and left pairs of said 7-segment displays.

23. The apparatus as claimed in claim 11 wherein said switch means includes switches which are mounted on an end plate adjacent the eyepiece, and the end plate is vertical when the associated telescope is held in a horizontal position.

24. The apparatus as claimed in claim 11 wherein a plurality of resistors are connected in series with respective segments of the numerals in said digital display, and the brightness of said display is sufficiently low as to match the field of view of its associated telescope, whereby a person's eye may comfortably observe both the digital display and the field of view of the associated telescope at the same time.

25. The apparatus as claimed in claim 11 wherein the digital display has four digits within a size of about 9 square millimeters.

26. The apparatus as claimed in claim 11 wherein the digital display occupies no more than 25% of the viewing area in a telescope eyepiece.

27. The apparatus as claimed in claim 11 wherein the switch means includes a start/stop switch, a reset-to-zero switch and a mode switch.

28. The apparatus as claimed in claim 11 wherein the digital display includes 7-segment numerical digital displays having a height of about 3 millimeters, and the digits in said displays have a height of about 2 millimeters.

* * * * *